US012332579B2

(12) United States Patent
Akagi

(10) Patent No.: US 12,332,579 B2
(45) Date of Patent: Jun. 17, 2025

(54) LIGHT EMITTING CHIP INCLUDING A PLURALITY OF LIGHT EMITTING UNITS AND IMAGE FORMING

(71) Applicant: CANON KABUSHIKI KAISHA, Tokyo (JP)

(72) Inventor: Daisuke Akagi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/232,893

(22) Filed: Aug. 11, 2023

(65) Prior Publication Data

US 2024/0069461 A1 Feb. 29, 2024

(30) Foreign Application Priority Data

Aug. 23, 2022 (JP) ................................ 2022-132718

(51) Int. Cl.
*G03G 15/043* (2006.01)
*G03G 15/04* (2006.01)

(52) U.S. Cl.
CPC ..... *G03G 15/043* (2013.01); *G03G 15/04045* (2013.01); *G03G 2215/0407* (2013.01)

(58) Field of Classification Search
CPC ...................... G03G 15/043; G03G 15/04045
USPC ............................................ 399/38, 51, 177
See application file for complete search history.

(56) References Cited

U.S. PATENT DOCUMENTS

| | | | |
|---|---|---|---|
| 5,389,953 | A | 2/1995 | Agar et al. |
| 11,133,119 | B2 | 9/2021 | Akagi |
| 2023/0324826 | A1 | 10/2023 | Akagi |

FOREIGN PATENT DOCUMENTS

| | | | |
|---|---|---|---|
| JP | 2014108546 | * | 6/2014 |
| JP | 2021-035765 | A | 3/2021 |
| JP | 2022-096967 | A | 6/2022 |

OTHER PUBLICATIONS

Mar. 29, 2024 Office Action in Japanese Patent Application No. 2022-132718 (with English translation).
Co-pending U.S. Appl. No. 18/351,721, filed Jul. 13, 2023.

* cited by examiner

*Primary Examiner* — Hoan H Tran
(74) *Attorney, Agent, or Firm* — Venable LLP

(57) ABSTRACT

A light emitting chip includes: a first data storage unit configured to store data for causing a first light emitting unit to emit light; a second data storage unit configured to store data for causing a second light emitting unit to emit light; a signal output unit configured to output a first trigger signal and a second trigger signal delayed with respect to the first trigger signal; and a drive unit configured to drive the first light emitting unit, in a case where the first trigger signal is output, based on data stored in the first data storage unit, and drive the second light emitting unit, in a case where the second trigger signal is output, based on data stored in the second data storage unit.

18 Claims, 17 Drawing Sheets

LIGHT EMITTING CHIP INCLUDING A PLURALITY OF LIGHT EMITTING UNITS AND IMAGE FORMING

BACKGROUND OF THE INVENTION

Field of the Invention

The present invention relates to a light emitting chip including a plurality of light emitting units, and an image forming apparatus that forms an image using the light emitting chip.

Description of the Related Art

An electrophotographic image forming apparatus forms an electrostatic latent image on the photoconductor by exposing a rotationally driven photoconductor, and forms an image by developing the electrostatic latent image with toner. Here, a direction parallel to the rotation axis of the photoconductor is referred to as a main scan direction. Japanese Patent Laid-Open No. 2021-035765 discloses an image forming apparatus that performs exposure by using an exposure apparatus including a plurality of columns of light emitting units arranged in a sub scan direction corresponding to a rotation direction of a photoconductor, in which each column includes a plurality of light emitting units arranged in a main scan direction. In Japanese Patent Laid-Open No. 2021-035765, flip-flop circuits configured to hold image data are respectively provided in corresponding number as number of light emitting units, and when image data is held in all the flip-flop circuits, control of the light emitting units are performed all at once. Accordingly, there is a concern in the aforementioned exposure head that simultaneously turning on a large number of light emitting units may cause electrical noise such as switching noise to increase.

SUMMARY OF THE INVENTION

The present disclosure reduces occurrence of electrical noise due to simultaneously turning on a plurality of light emitting units in an image forming apparatus including an exposure head provided with a plurality of light emitting units.

According to an aspect of the present invention, a light emitting chip includes: a light emitting unit array including a plurality of light emitting units arranged in a predetermined direction; an image data input terminal configured to be input an image data; a first data storage unit configured to store data, input from the image data input terminal, for causing a first light emitting unit included in the plurality of light emitting units to emit light; a second data storage unit configured to store data, input from the image data input terminal, for causing a second light emitting unit included in the plurality of light emitting units to emit light; a signal output unit configured to output a first trigger signal and a second trigger signal delayed with respect to the first trigger signal; and a drive unit configured to drive the first light emitting unit, in a case where the first trigger signal is output, based on data stored in the first data storage unit, and drive the second light emitting unit, in a case where the second trigger signal is output, based on data stored in the second data storage unit.

Further features of the present invention will become apparent from the following description of exemplary embodiments with reference to the attached drawings.

DESCRIPTION OF THE EMBODIMENTS

Figure 1:
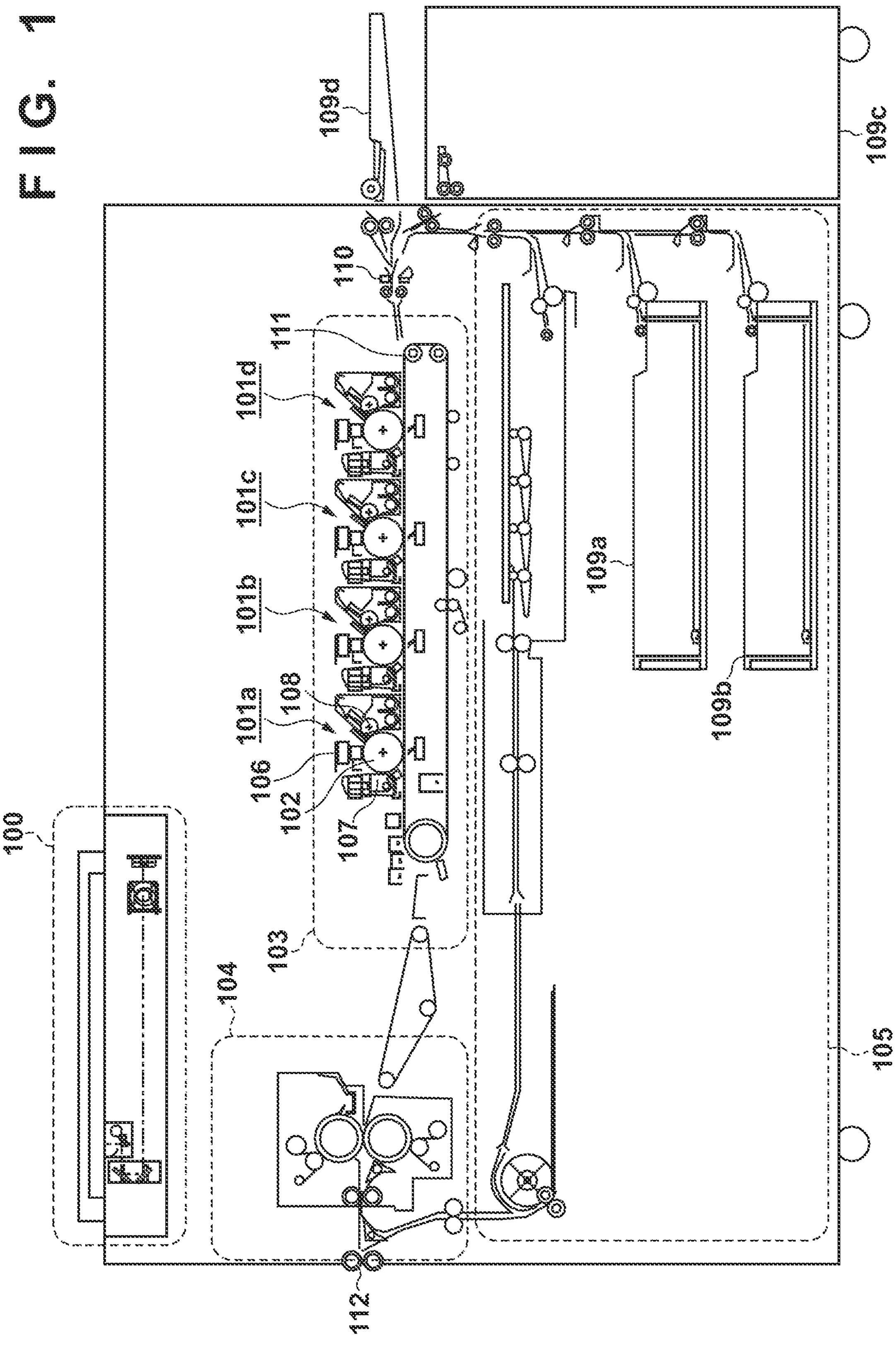
FIG. 1 is a schematic configuration diagram of an image forming apparatus according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

FIG. 1 is a schematic configuration diagram of an image forming apparatus according to the present embodiment. A reading unit 100 reads a document placed on a document plate and generates image data representing a reading result. An image creating unit 103 forms an image on a sheet based on, for example, the image data generated by the reading unit 100 or image data received from an external apparatus via a network.

The image creating unit 103 includes image forming units 101_a_, 101_b_, 101_c_ and 101_d_. The image forming units 101_a_, 101_b_, 101_c_ and 101_d_ respectively form black, yellow, magenta and cyan toner images. The image forming units

101*a*, 101*b*, 101*c* and 101*d* have a similar configuration and therefore will be collectively referred to as an image forming unit 101. In forming an image, a photoconductor 102 of the image forming unit 101 is rotationally driven in a clockwise direction of the diagram. A charger 107 charges the photoconductor 102. An exposure head 106, which is an exposure apparatus, exposes the photoconductor 102 in accordance with the image data, and forms an electrostatic latent image on the photoconductor 102. A developer 108 develops the electrostatic latent image on the photoconductor 102 with toner. The toner image formed on the photoconductor 102 is transferred onto a sheet that is conveyed on a transfer belt 111. Here, different colors from black, yellow, magenta and cyan can be reproduced by transferring toner images formed on respective photoconductors 102 onto a sheet in an overlapping manner.

A conveyance unit 105 controls feed and conveyance of a sheet. Specifically, the conveyance unit 105 feeds a sheet to the conveyance path of the image forming apparatus from a unit specified among internal storage units 109*a* and 109*b*, an external storage unit 109*c*, and a manual feed unit 109*d*. The sheet being fed is conveyed to a registration roller 110. The registration roller 110 conveys the sheet onto the transfer belt 111 at a predetermined timing such that toner images formed on respective photoconductors 102 are transferred onto the sheet. As has been described above, the toner images are transferred onto the sheet while the sheet is being conveyed on the transfer belt 111. A fixing unit 104 heats and pressurizes the sheet, on which the toner images are transferred, to fix the toner images on the sheet. After the toner images are fixed, the sheet is discharged by a discharge roller 112 to the outside of the image forming apparatus.

Figure 2A:
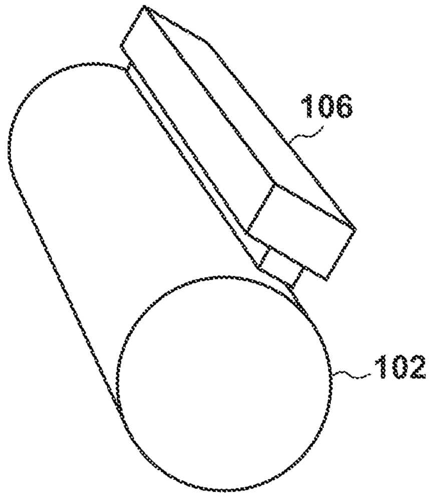
FIGS. 2A and 2B are diagrams illustrating an exposure head and a photoconductor according to an embodiment.
Figure 2B:
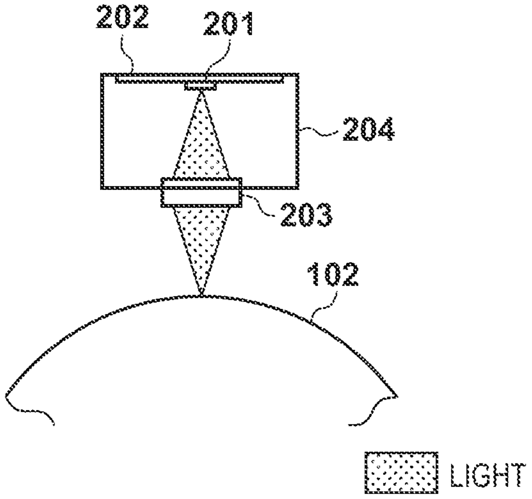

FIGS. 2A and 2B illustrate the photoconductor 102 and the exposure head 106. The exposure head 106 includes a light emitting point group 201, a printed substrate 202 in which the light emitting point group 201 is mounted, a rod lens array 203, and a housing 204 that supports the rod lens array 203 and the printed substrate 202. The rod lens array 203 focuses the light emitted from the light emitting point group 201 onto the photoconductor 102 to form an imaging spot of a predetermined size on the photoconductor 102.

Figure 3A:
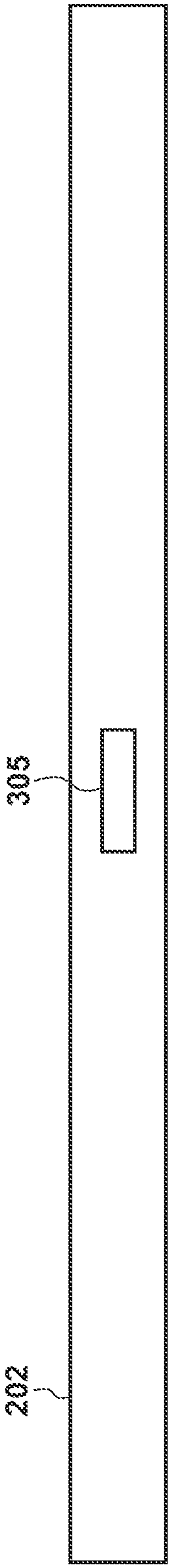
FIGS. 3A and 3B are diagrams illustrating a printed substrate of an exposure head according to an embodiment.
Figure 3B:
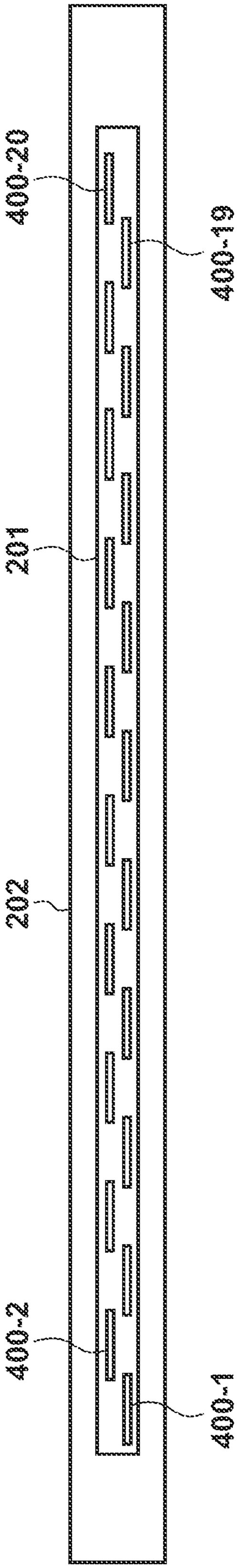

FIGS. 3A and 3B illustrate the printed substrate 202. Here, FIG. 3A illustrates a surface on which a connector 305 is mounted, and FIG. 3B illustrates a surface on which the light emitting point group 201 is mounted (an opposite surface to the surface on which the connector 305 is mounted). In the present embodiment, the light emitting point group 201 includes 20 light emitting chips 400-1 to 400-20. The light emitting chips 400-1 to 400-20 are arranged in two staggered columns along the main scan direction. In the following description, the light emitting chips 400-1 to 400-20 will also be collectively referred to as light emitting chips 400. Each of the light emitting chips 400 includes a plurality of light emitting points (light emitting elements). Each of the light emitting chips 400 of the printed substrate 202 is connected, via a connector 305, to an image controller 700 (FIG. 7), which is a control unit.

Figure 4:
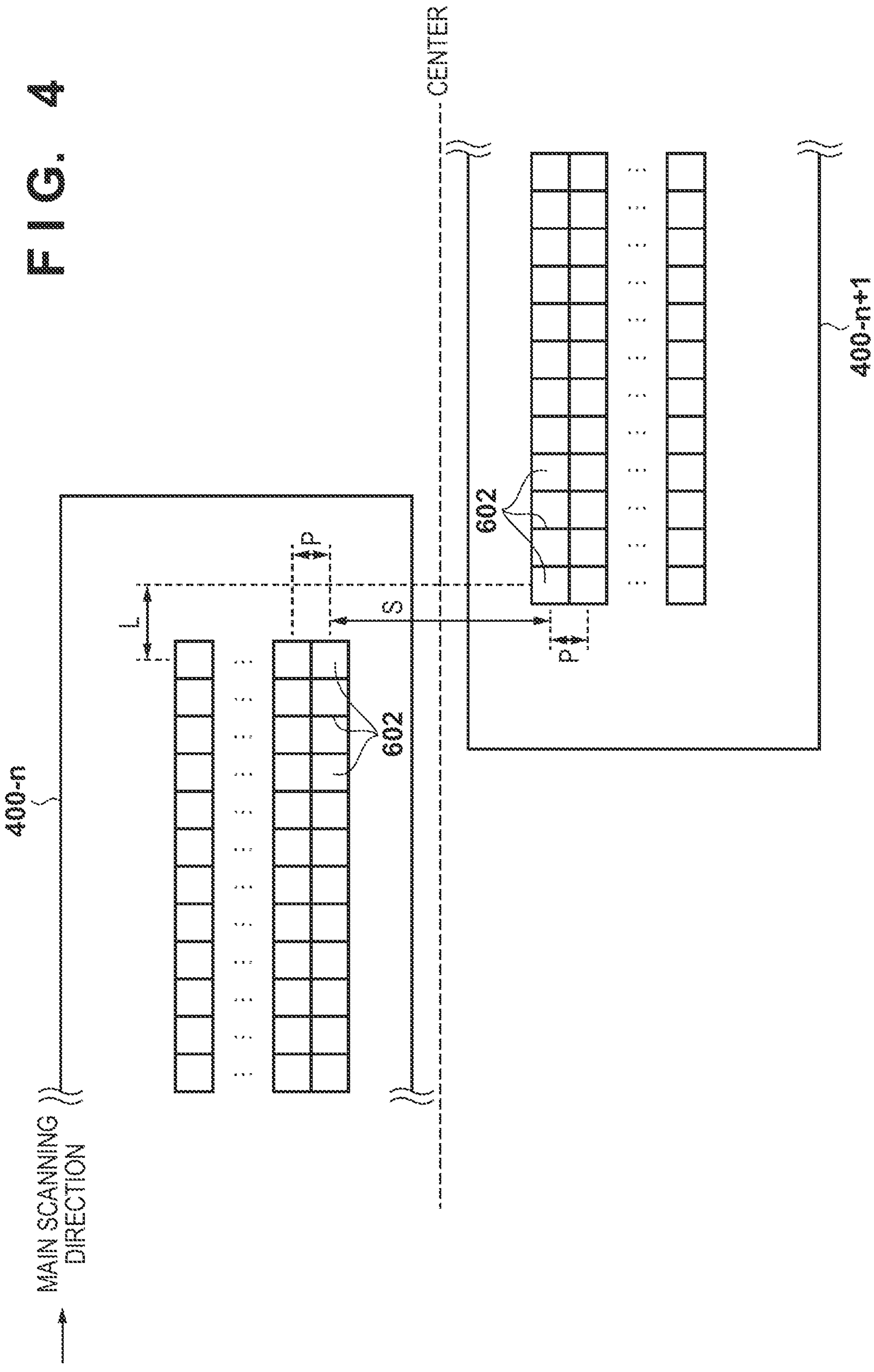
FIG. 4 is an explanatory diagram of an arrangement of light emitting elements in a light emitting chip, according to an embodiment.

FIG. 4 is an explanatory diagram of an arrangement of the light emitting chips 400 and light emitting points 602 provided on the light emitting chips 400. One light emitting chip 400 includes a plurality of sets of 748 light emitting points 602 arranged along the main scan direction. Here, the plurality of sets are arranged along a sub scan direction orthogonal to the main scan direction. As such, the light emitting chips 400 are arranged two-dimensionally along both the main scan direction and the sub scan direction. In other words, the light emitting points 602 may be arranged by including M rows in the circumferential direction of the photoconductor and N columns in the axial direction of the photoconductor. In the following description, the number of sets is assumed to be four, as an example. In other words, it is assumed in the following exemplary embodiment that the light emitting chips 400 include four sets of 748 light emitting points 602 arranged along the main scan direction, i.e., a total of 2992 light emitting points 602. The pitch of the light emitting points 602 adjacent to each other in the main scan direction is about 21.16 μm, which corresponds to a resolution of 1200 dpi. Therefore, the length of one set of 748 light emitting points 602 in the main scan direction is about 15.8 mm. In addition, the pitch (length P in FIG. 4) of the light emitting points 602 adjacent to each other in the sub scan direction is about 21.16 μm, which corresponds to a resolution of 1200 dpi. Furthermore, the pitch (length L in FIG. 4) between the light emitting points 602 of two light emitting chips 400 adjacent to each other in the main scan direction is about 21.16 μm, which corresponds to a resolution of 1200 dpi.

Figure 5:
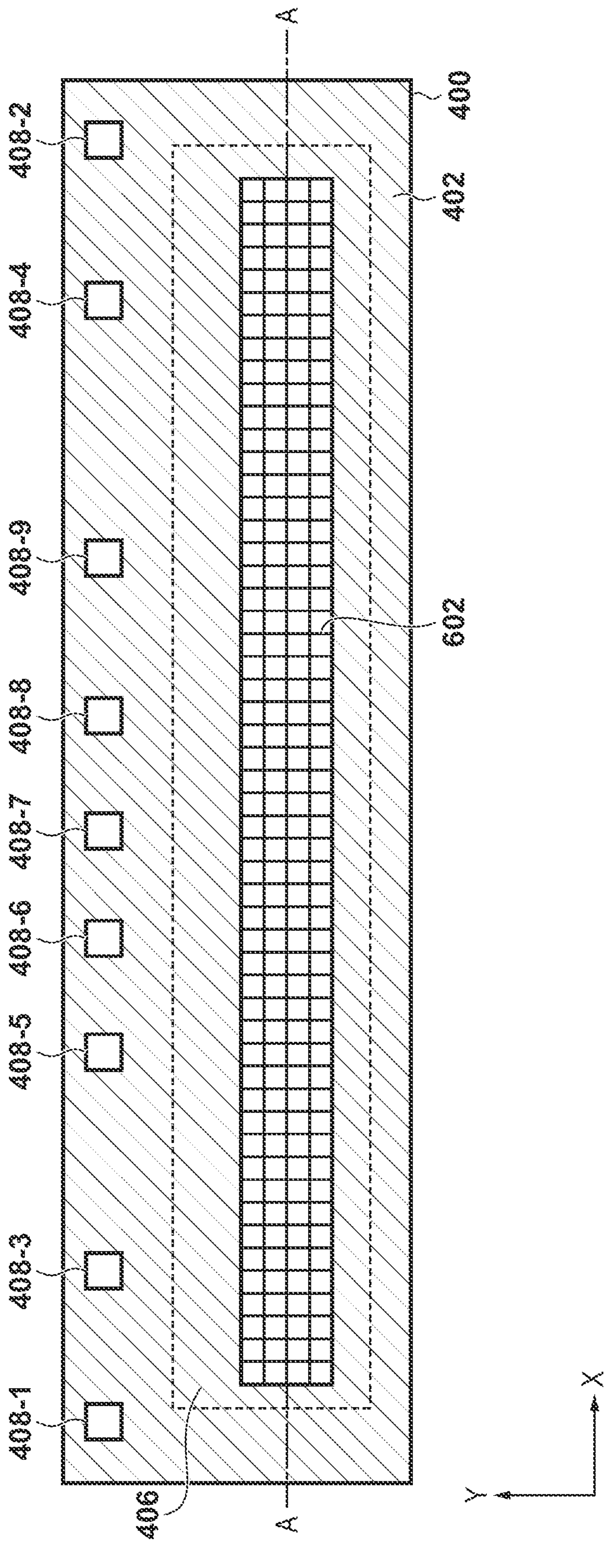
FIG. 5 is a plan view of a light emitting chip, according to an embodiment.

FIG. 5 is a plan view of the light emitting chip 400. The plurality of light emitting points 602 of the light emitting chip 400 are formed, for example, on a light emitting substrate 402, which is a silicon substrate. Furthermore, a circuit unit 406 configured to control the plurality of light emitting points 602 is formed on the light emitting substrate 402. A signal line configured to communicate with the image controller 700, a power line configured to connect to a power source, and a ground line configured to connect to the ground will be connected to pads 408-1 to 408-9. The signal line, the power line, and the ground line are wires made of gold, for example.

Figure 6:
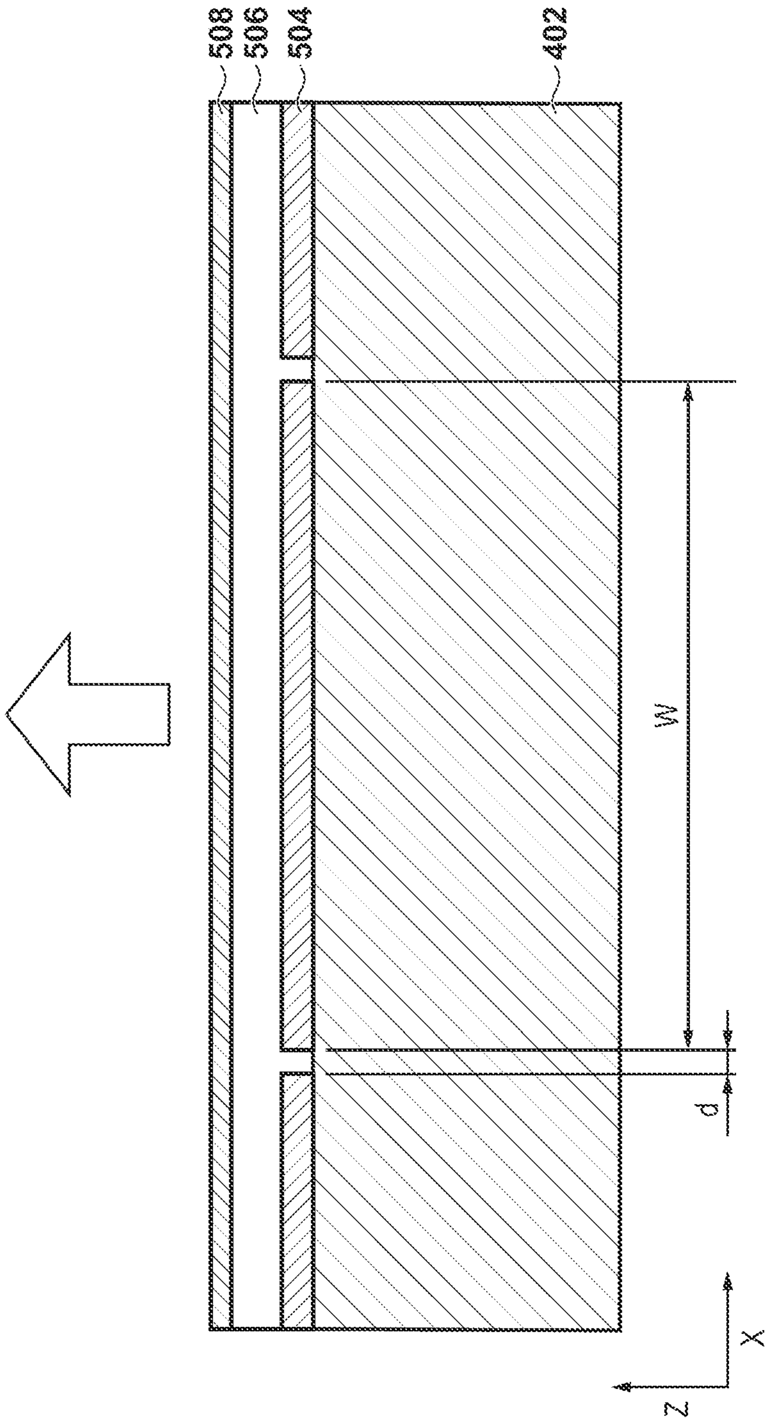
FIG. 6 is a cross sectional view of a light emitting chip, according to an embodiment.

FIG. 6 illustrates a part of a cross section taken along line A-Ain FIG. 5. A plurality of lower electrodes 504 are formed on the light emitting substrate 402. A gap of a length d is provided between two adjacent lower electrodes 504. Alight emitting layer 506 is provided on the lower electrodes 504, and an upper electrode 508 is provided on the light emitting layer 506. The upper electrode 508 is one common electrode for the plurality of lower electrodes 504. When a predetermined voltage is applied between the lower electrode 504 and the upper electrode 508, electric current flows from the lower electrode 504 to the upper electrode 508, and thus the light emitting layer 506 emits light. Therefore, a region of the light emitting layer 506 corresponding to a region of one lower electrode 504 corresponds to one light emitting point 602. In other words, the light emitting substrate 402 of the present embodiment includes a plurality of light emitting points. Here, the light emitting point may also be referred to as a light emitting unit. A light emitting unit array including a plurality of light emitting units arranged in the main scan direction is formed in each of the light emitting chips 400.

Organic EL film, for example, may be used for the light emitting layer 506. Alternatively, an inorganic EL film may be used for the light emitting layer 506. The upper electrode 508 is formed of, for example, a transparent electrode made of indium tin oxide (ITO) or the like, for transmitting the emission wavelength of the light emitting layer 506. Although the whole of the upper electrode 508 transmits the emission wavelength of the light emitting layer 506 in the present embodiment, the whole of the upper electrode 508 needs not transmit the emission wavelength. Specifically, a part of the upper electrode 508 corresponding to a region where light is emitted from each light emitting point 602 may transmit the light emission wavelength.

Although one continuous light emitting layer 506 is formed in FIG. 6, a plurality of light emitting layers 506 each having the similar width as the width W of the lower electrode 504 may be respectively formed on the lower electrode 504. In addition, although the upper electrode 508 is one common electrode for the plurality of lower electrodes 504 in FIG. 6, a plurality of upper electrodes 508 each having the similar width as the width W of the lower electrode may be formed as corresponding to each of the lower electrodes 504. Alternatively, a first plurality of lower electrodes 504 among the lower electrodes 504 of each of the light emitting chips 400 may be covered by a first light emitting layer 506, and a second plurality of lower electrodes 504 may be covered by a second light emitting layer 506. Alternatively, a first upper electrode 508 may be commonly formed as corresponding to a first plurality of lower electrodes 504 and a second upper electrode 508 may be commonly formed as corresponding to a second plurality of lower electrodes 504, among the lower electrodes 504 of each of the light emitting chips 400. Also in the aforementioned configuration, one lower electrode 504, a region of the light emitting layer 506 and the upper electrode 508 corresponding to the one lower electrode 504 form one light emitting point (light emitting element) 602. Here, the light emitting point 602 may also be referred to as a light emitting unit.

Figure 7:
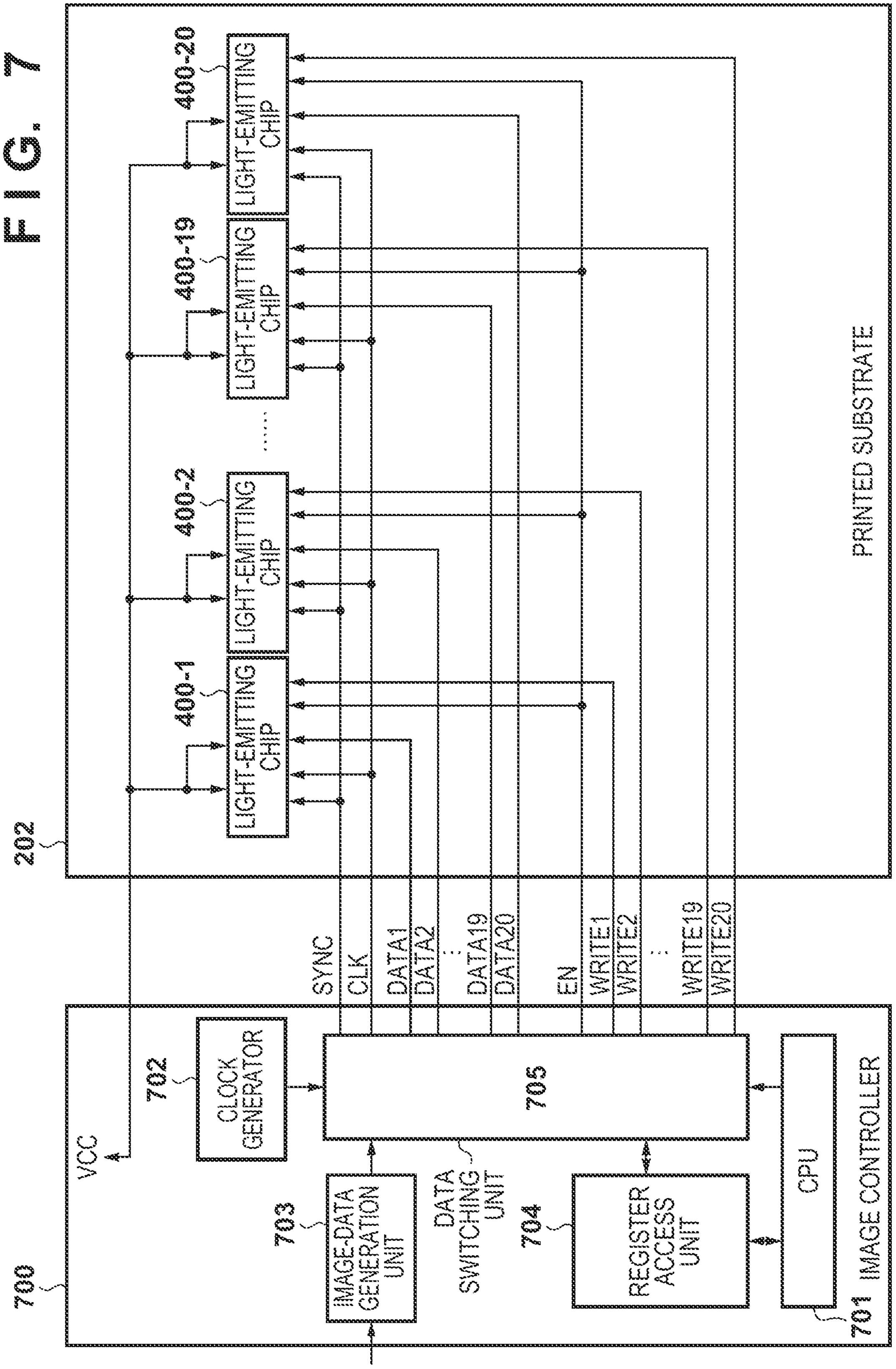
FIG. 7 is a control configuration diagram of a light emitting chip, according to an embodiment.

FIG. 7 illustrates a control configuration of the light emitting chips 400. A data switching unit 705 and each of the light emitting chips 400 are connected by a plurality of signal lines (wires). Specifically, the data switching unit 705 and the light emitting chip 400-*n* (n being an integer from 1 to 20) are connected by a signal line DATAn and a signal line WRITEn. The signal line DATAn is used by the data switching unit 705 to transmit image data to the light emitting chip 400-*n*. The signal line WRITEn is used by the data switching unit 705 to write control data to a register of the light emitting chip 400-*n*.

In addition, the data switching unit 705 and all the light emitting chips 400 are connected by one signal line CLK, one signal line SYNC, and one signal line EN. The signal line CLK is used for transmitting a clock signal for data transmission in the signal lines DATAn and WRITEn. The data switching unit 705 outputs, to the signal line CLK, a clock signal generated based on a reference clock signal from a clock generator 702. Signals transmitted to the signal line SYNC and the signal line EN will be described below.

A CPU 701 controls the image forming apparatus 100 as a whole. An image data generation unit 703 performs various types of image processing such as halftone processing on the image data received from the reading unit 100 or an external apparatus, and generates image data for performing ON/OFF control of light emission from the light emitting point 602 of each of the light emitting chips 400. The image data generation unit 703 transmits the generated image data to the data switching unit 705. A register access unit 704 receives, from the CPU 701, control data to be written to the register of each of the light emitting chips 400, and transmits the control data to the data switching unit 705.

Figure 8:
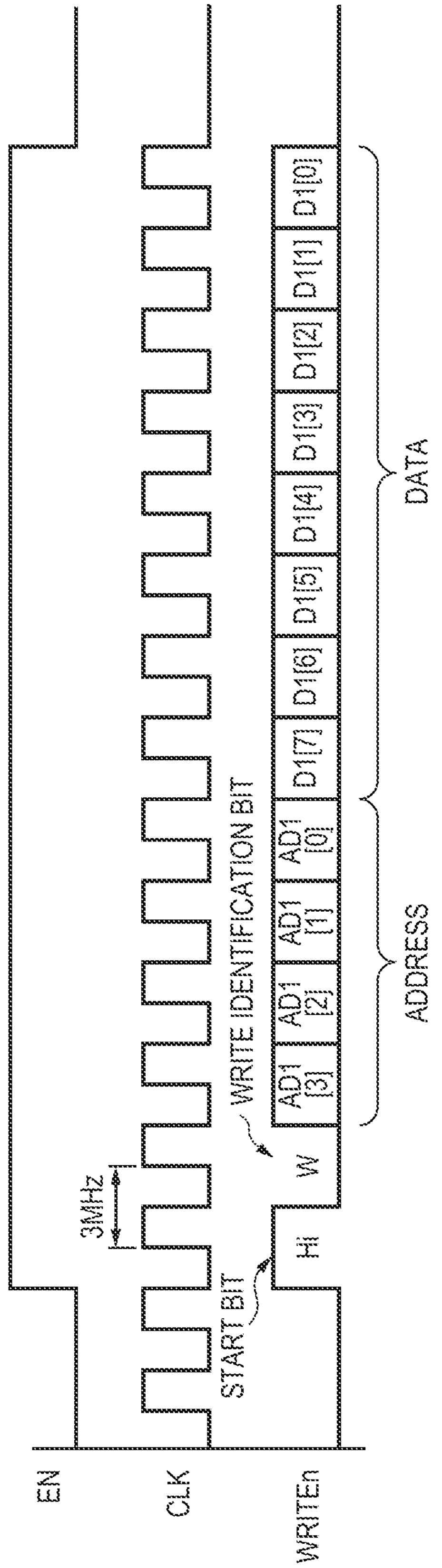
FIG. 8 is diagram illustrating example signals on respective signal lines when a register of a light emitting chip is accessed, according to an embodiment.

FIG. 8 illustrates signals of the respective signal lines when control data is written to registers of the light emitting chips 400. An enable signal, which rises to a high level indicating in-communication during communication, is output to the signal line EN. The data switching unit 705 transmits a start bit to the signal line WRITEn in synchronization with the rising of the enable signal. Subsequently, the data switching unit 705 transmits a write identification bit indicating write operation, and subsequently transmits an address (4 bits in the present example) of the register, to which control data is written, and control data (8 bits in the present example). In writing to the register, the data switching unit 705 set the frequency of the clock signal transmitted to the signal line CLK to be 3 MHz, for example.

Figure 9:
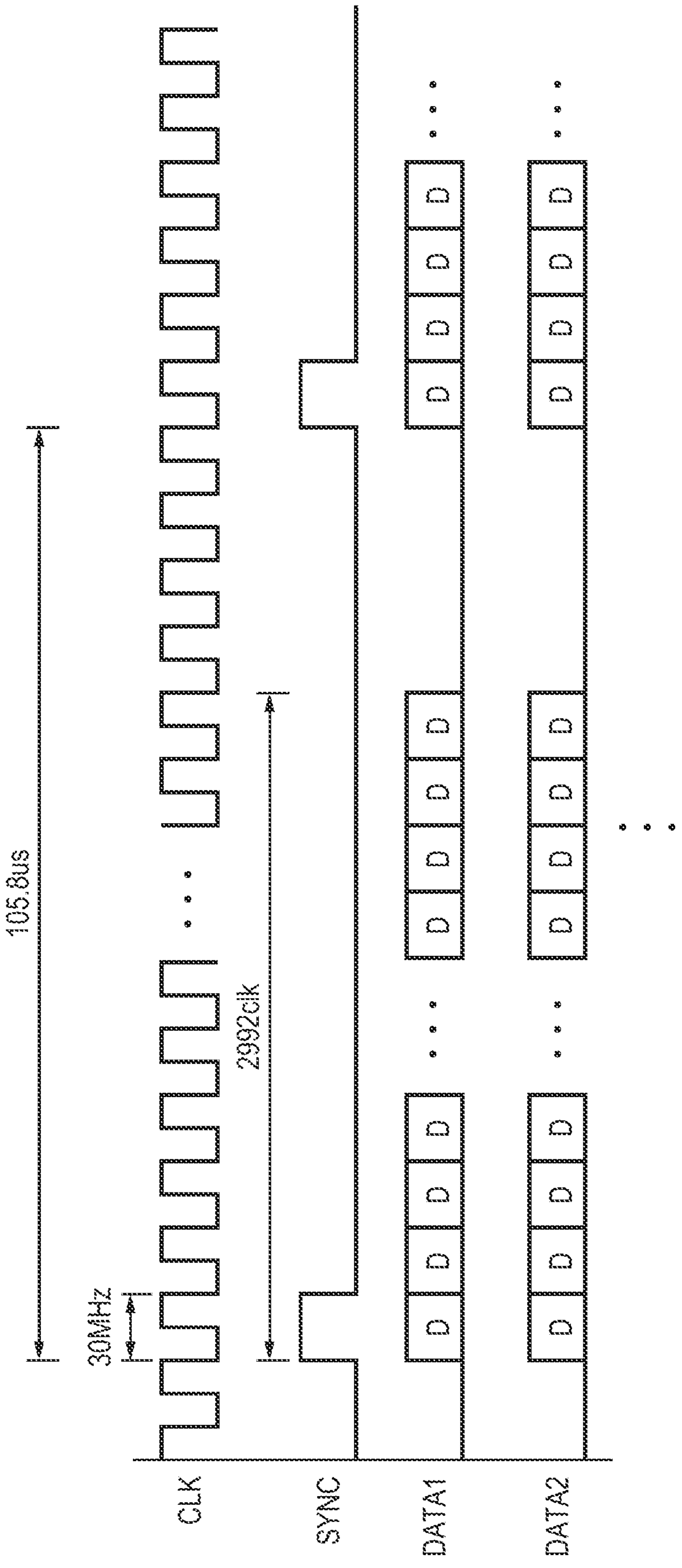
FIG. 9 is diagram illustrating example signals on respective signal lines when image data is transmitted to a light emitting chip, according to an embodiment.

FIG. 9 illustrates signals of respective signal lines when image data is transmitted to each of the light emitting chips 400. A cyclic line synchronization signal indicating an exposure timing of one line in the photoconductor 102 is output to the signal line SYNC. Assuming that the circumferential speed of the photoconductor 102 is 200 mm/s and the resolution in the sub scan direction is 1200 dpi (about 21.16 μm), the line synchronization signal is output at a cycle of about 105.8 μs. The data switching unit 705 transmits the image data to signal lines DATA1 to DATA20 in synchronization with the rising of the line synchronization signal. In the present embodiment, since each of the light emitting chips 400 includes 2992 light emitting points 602, it is necessary to transmit image data, to each of the light emitting chips 400, indicating emission/non-emission of light for each of a total of 2992 light emitting points 602 within a cycle of about 105.8 μs. In order to transmit image data for a total of 2992 light emitting points 602 within a period of about 105.8 μs, the data switching unit 705 sets, in transmitting image data, the frequency of the clock signals transmitted to the signal line CLK to 30 MHz in the present example, as illustrated in FIG. 9.

Figure 10:
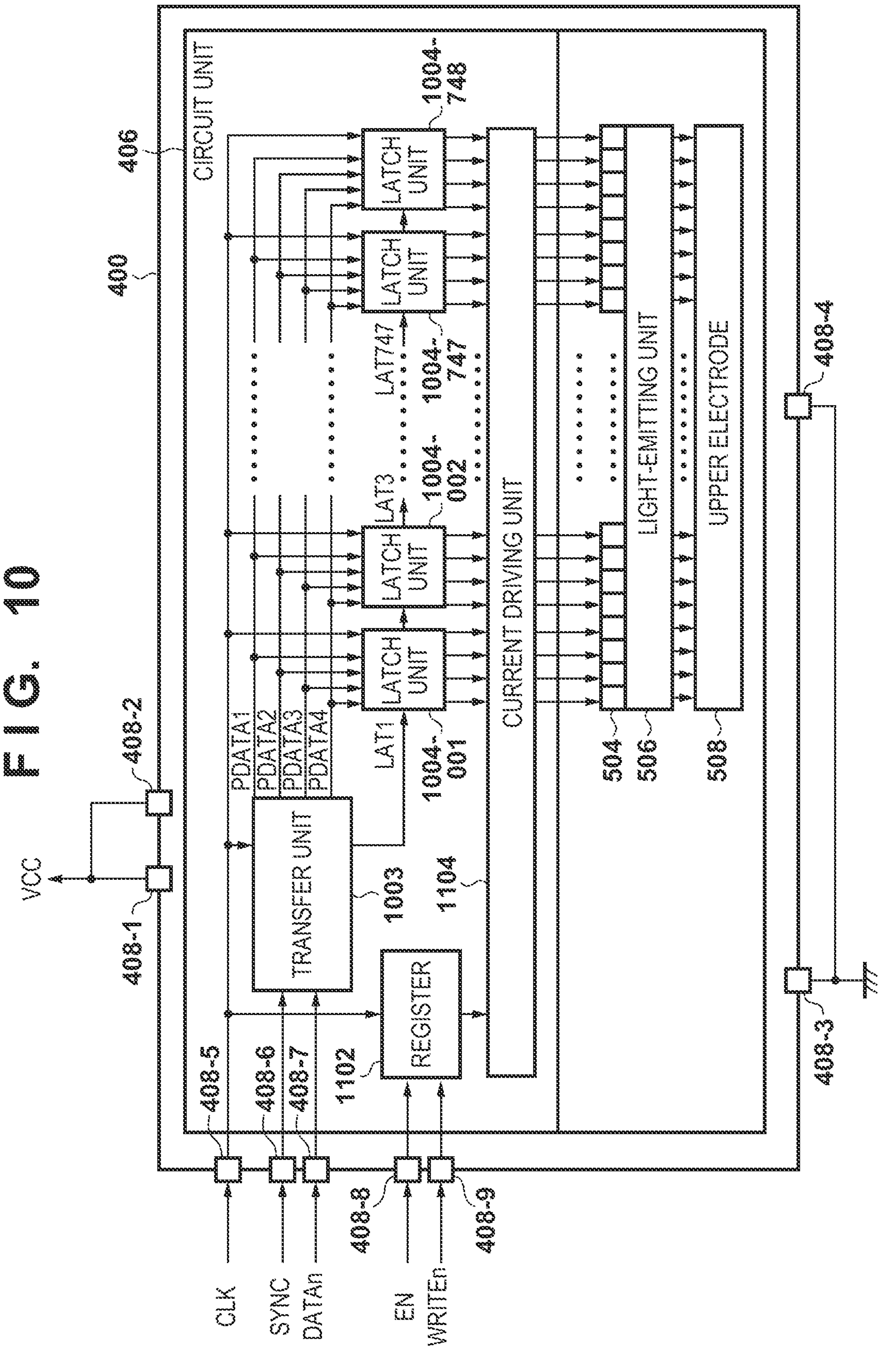
FIG. 10 is a functional block diagram of a light emitting chip, according to an embodiment.

FIG. 10 is a functional block diagram of one light emitting chip 400-*n*. As also illustrated in FIG. 5, the light emitting chip 400 includes nine pads 408-1 to 408-9. The pads 408-1 and 408-2 are connected to a power supply voltage VCC by a power line. Electric power is supplied to each circuit of the circuit unit 406 of the light emitting chips 400 by the power supply voltage VCC. The pads 408-3 and 408-4 are connected to the ground by a ground line. Each circuit of the circuit unit 406 and the upper electrode 508 are connected to the ground via the pads 408-3 and 408-4. The signal line CLK is connected to a transfer unit 1003, a register 1102, and latch units 1004-001 to 1004-748 via the pad 408-5. The signal lines SYNC and DATAn are respectively connected to the transfer unit 1003 via the pads 408-6 and 408-7. In other words, the pad 408-6 corresponds to a synchronization signal input terminal, and the pad 408-7 corresponds to an image data input terminal. The signal lines EN and WRITEn are respectively connected to the register 1102 via the pads 408-8 and 408-9. As has been described above, the register 1102 stores control data indicating control information. Details of the control information will be described below.

In the following, the operation of the transfer unit 1003 and the latch units 1004-001 to 1004-748 (also collectively referred to as latch units 1004) will be described, referring to FIGS. 11 to 14. Here, it is assumed that the transfer unit 1003 receives, with the line synchronization signal from the signal line SYNC as a starting point and in synchronization with the clock signal, pieces of image data each indicating emission/non-emission of light of one light emitting point 602 in the order of D1, D2, D3, D2992. FIG. 14 illustrates a state in which the transfer unit 1003 has received pieces of image data D1 to D12.

Figure 11:
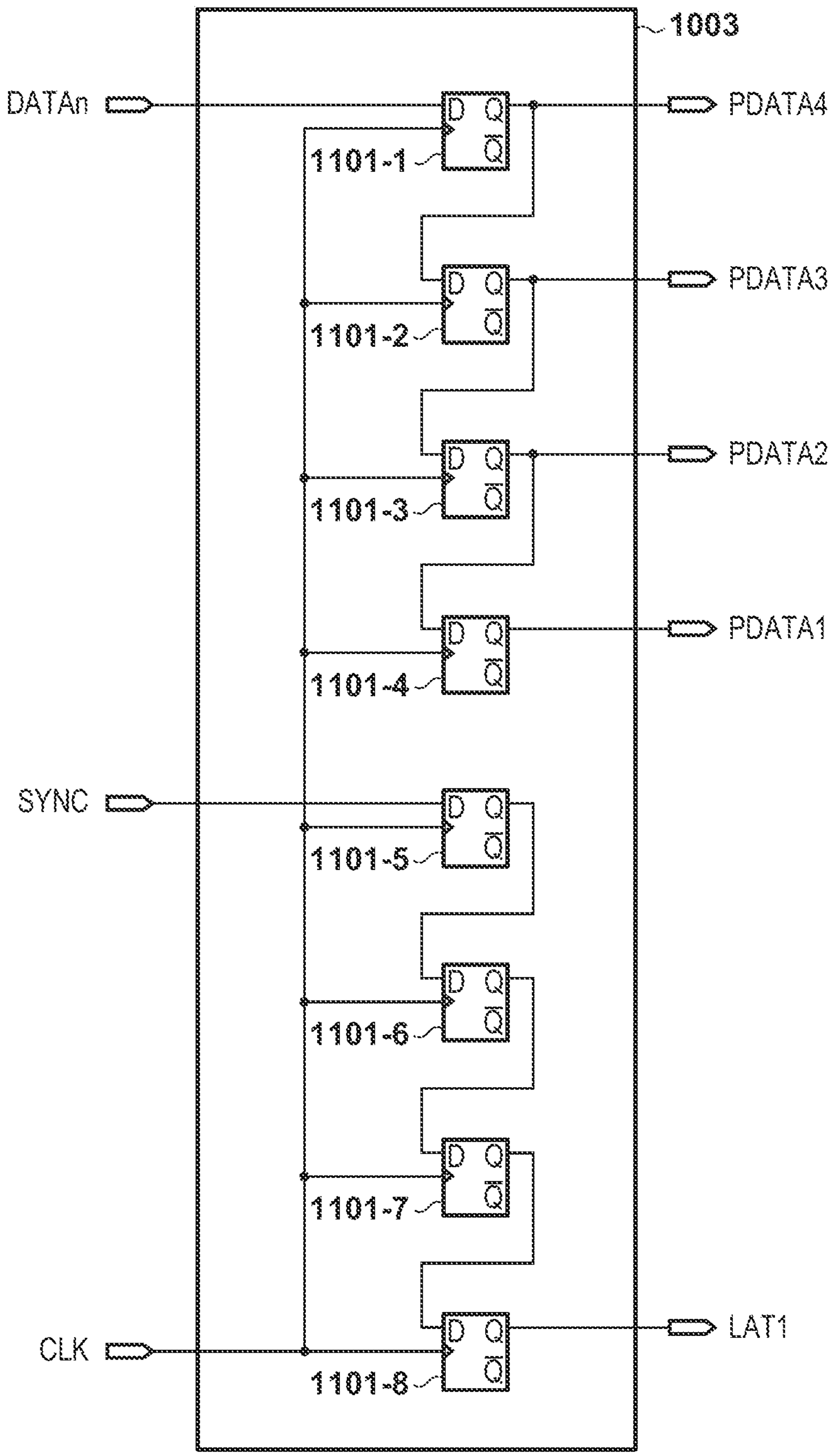
FIG. 11 is a configuration diagram of a transfer unit, according to an embodiment.

FIG. 11 is a configuration diagram of the transfer unit 1003. A clock signal from the signal line CLK, a line synchronization signal from the signal line SYNC, and image data from the signal lines DATAn are input to the transfer unit 1003. D flip-flops 1101-1 to 1101-8 operate in accordance with the clock signal. The D flip-flop 1101-1 sequentially outputs the image data received from DATAn to a signal line PDATA4. The D flip-flop 1101-2 outputs the image data received from DATAn to a signal line PDATA3 by delaying one clock from the image data output from the D flip-flop 1101-1. Similarly, the D flip-flops 1101-3 and 1101-4 output the image data received from DATAn to signal lines PDATA2 and PDATA1 by respectively delaying two clocks and three clocks from the image data output from the D flip-flop 1101-1.

FIG. 14 illustrates image data output from the transfer unit 1003 to the signal lines PDATA1 to PDATA4. As illustrated in FIG. 14, the transfer unit 1003 outputs the pieces of image data D3, D2 and D1 respectively to the signal lines PDATA3, PDATA2 and PDATA1 at the timing when the transfer unit 1003 outputs the piece of image data D4 to the signal line PDATA4. More generally, the transfer unit 1003 outputs the pieces of image data D(4m−1), D(4m−2) and D(4m−3) respectively to the signal lines PDATA3, PDATA2 and PDATA1 at the timing when the transfer unit 1003 outputs the piece of image data D(4m) to the signal line PDATA4, where m being an integer from 1 to 748.

The transfer unit 1003 delays the line synchronization signal by the D flip-flops 1101-5 to 1101-8, and outputs a first latch signal to a signal line LAT1 at a timing when the transfer unit 1003 outputs D4 to the signal line PDATA4.

Figure 12:
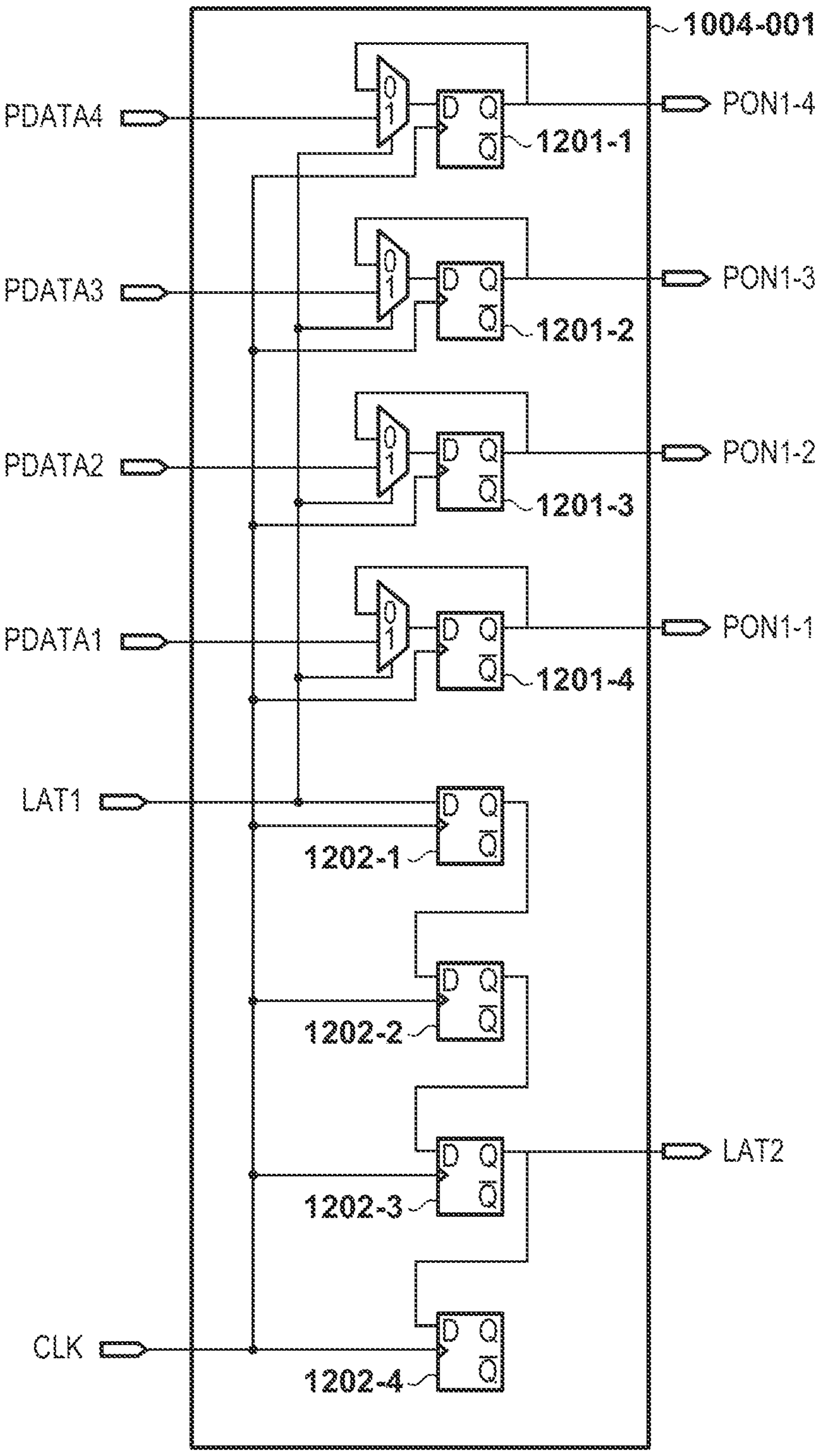
FIG. 12 is a configuration diagram of a latch unit, according to an embodiment.

FIG. 12 is a configuration diagram of the latch unit 1004-001. D flip-flops 1202-1 to 1202-4 and latch circuits 1201-1 to 1201-4 operate in accordance with the clock signal from the signal line CLK. The image data from the signal lines PDATA4 to PDATA1 and the first latch signal from the signal line LAT1 are input to the latch circuits 1201-1 to 1201-4. Upon receiving the first latch signal from the signal line LAT1, the latch circuits 1201-1 to 1201-4 latch the values being output to the signal lines PDATA4 to PDATA1 at that time, and output drive signals based on the latched values to the signal lines PON1-4 to PON1-1, as illustrated in FIG. 14. That is, the latch circuits 1201-1 to 1201-4 store the input image data, and output drive signals based on the stored image data. In other words, the latch circuits 1201-1 to 1201-4 correspond to a first data storage unit or a plurality of data storage units. Furthermore, the first latch signal corresponds to a first trigger signal. According to FIG. 14, the signal lines PON1-1 to PON1-4 output drive signals based on the pieces of image data D1 to D4. In the present embodiment, one light emitting chip 400 includes the structure in which four sets of 748 light emitting points 602 arranged along the main scan direction are arranged along the sub scan direction, as has been described referring to FIG. 4. For example, the light emitting points 602 of each set are numbered 1 to 748 along the X direction in FIG. 5 (corresponding to the main scan direction). In this case, the respective drive signals output to the signal lines PON1-4 to PON1-1 are drive signals of each first light emitting point 602 of the four sets. The drive signals are input to the current drive unit 1104. The latch unit 1004-001 maintains outputting drive signals based on the pieces of image data D1 to D4 until receiving a first latch signal based on the next line synchronization signal. In other words, the drive signals based on the pieces of image data D1 to D4 are output for the duration of two consecutive line synchronization signals (about 105.8 μs in the present example). In addition, the latch unit 1004-001 delays the first latch signal by the D flip-flops 1202-1 to 1202-4, and outputs a second latch signal to a signal line LAT2 at a timing when the transfer unit 1003 outputs D8 to the signal line PDATA4.

Figure 13:
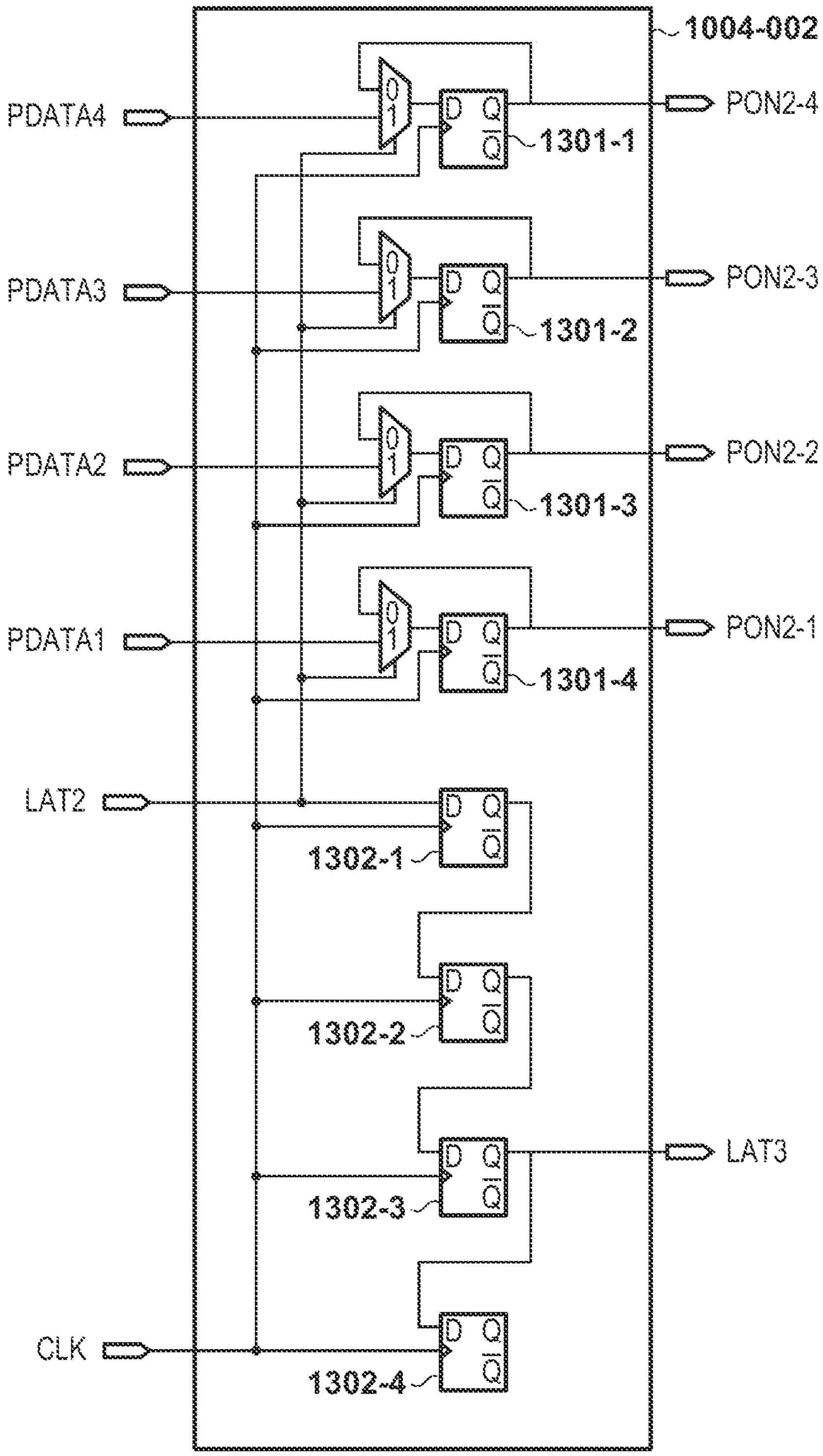
FIG. 13 is a configuration diagram of another latch unit, according to an embodiment.
Figure 14:
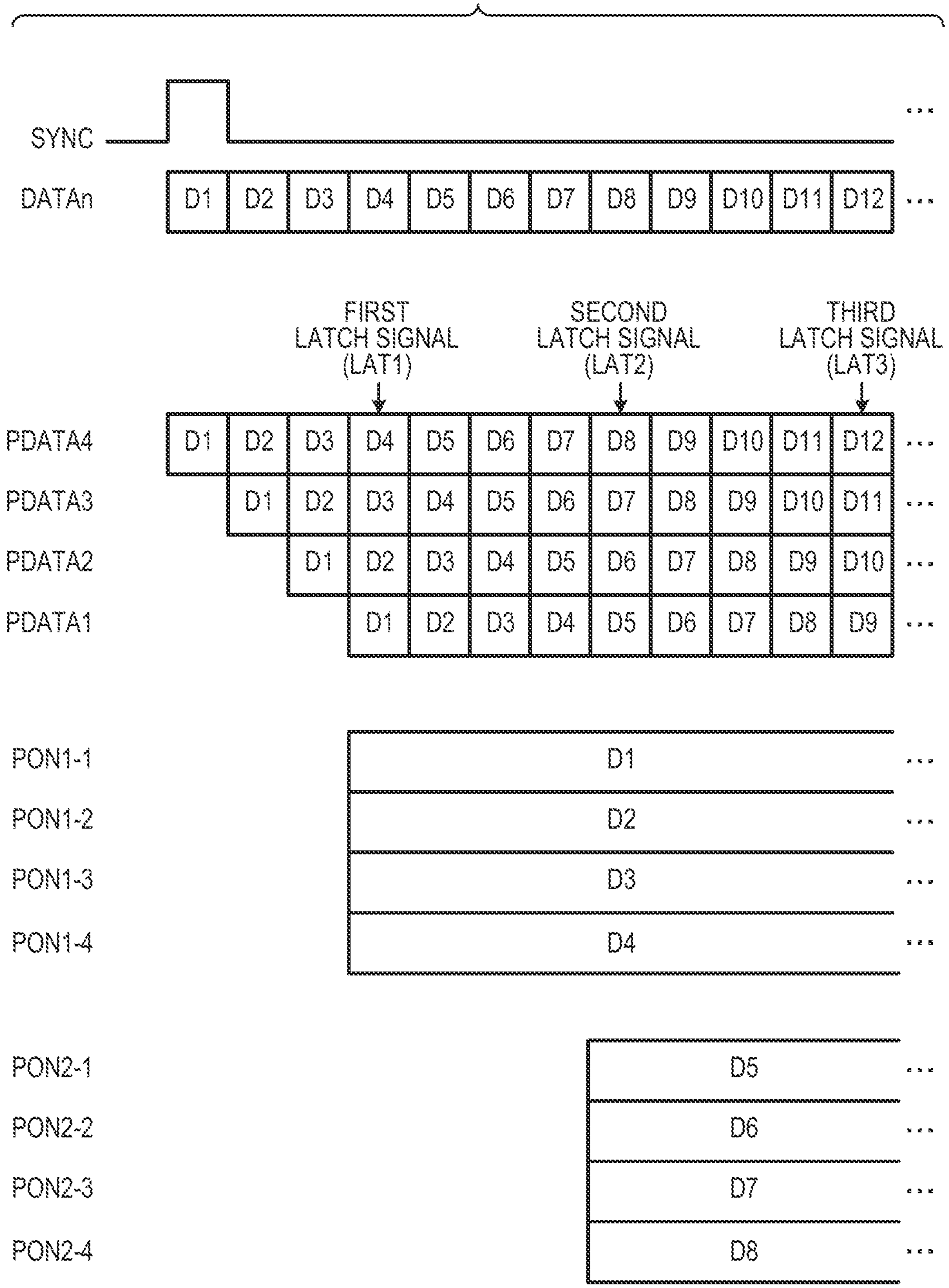
FIG. 14 is a timing chart of signals in a circuit unit, according to an embodiment.

FIG. 13 is a configuration diagram of the latch unit 1004-002. D flip-flops 1302-1 to 1302-4 and latch circuits 1301-1 to 1301-4 operate in accordance with the clock signal from the signal line CLK. The image data from the signal lines PDATA4 to PDATA1 and a second latch signal from a signal line LAT2 are input to the latch circuits 1301-1 to 1301-4. Upon receiving the second latch signal from the signal line LAT2, the latch circuits 1301-1 to 1301-4 latch the values being output to the signal lines PDATA4 to PDATA1 at that time, and output drive signals based on the latched values to the signal lines PON2-4 to PON2-1, as illustrated in FIG. 14. That is, the latch circuits 1301-1 to 1301-4 store the input image data, and output drive signals based on the stored image data. In other words, the latch circuits 1301-1 to 1301-4 correspond to a second data storage unit, or a plurality of data storage units. Furthermore, the second latch signal corresponds to a second trigger signal. The drive signals each output to the signal lines PON2-4 to PON2-1 are drive signals of the light emitting points 602 located next (right side in FIG. 5) in the main scan direction to the light emitting point 602 driven by the drive signals output to the signal lines PON1-4 to PON1-1. In other words, the drive signals output to the signal lines PON2-4 to PON2-1 are drive signals of each second light emitting point 602 of the four sets. According to FIG. 14, the signal lines PON2-1 to PON2-4 output drive signals based on the pieces of image data D5 to D8. The drive signals are input to the current drive unit 1104. The latch units 1004-002 maintains outputting the drive signals based on the pieces of image data D5 to D8 until receiving a second latch signal based on the next line synchronization signal. In other words, the drive signal based on the pieces of image data D5 to D8 are output for the duration of two consecutive line synchronization signals (about 105.8 μs in the present example). In addition, the latch unit 1004-002 delays the second latch signal by the D flip-flops 1302-1 to 1302-4, and outputs a third latch signal to a signal line LAT3 at a timing when the transfer unit 1003 outputs the piece of image data D12 to the signal line PDATA4.

The same goes for the operation of the latch units 1004-003 to 1004-748. In summary, each of the latch units 1004-*m* (m being an integer from 1 to 748) includes four latch circuits. The four latch circuits of the latch unit 1004-*m* each latch the pieces of image data D(4m), D(4m−1), D(4m−2), and D4(*m*−3) based on the m-th latch signal, and output drive signals based on the latched image data to the current drive unit 1104 for the duration of two consecutive line synchronization signals. Here, the four latch circuits of the latch unit 1004-*m* correspond to the m-th light emitting point 602 among the 748 light emitting points 602 arranged along the main scan direction of each of the first to the fourth sets. In other words, the four latch circuits of the latch unit 1004-*m* output the drive signals of the m-th light emitting point 602 of each of the first to the fourth sets. In addition, the latch units 1004-*m* except for m=748 generate an (m+1)-th latch signal based on the m-th latch signal and output the (m+1)-th latch signal to the latch unit 1004-(*m*+1). As such, each of the latch units 1004-001 to 1004-748 outputs a drive signal for controlling emission/non-emission of light of each light emitting point 602 to the current drive unit 1104 for the duration of two consecutive line synchronization signals. In other words, the transfer unit 1003 and the latch units 1004-001 to 1004-748 correspond to a signal output unit. In addition, the latch circuits 1101-5 to 1101-8 included in the transfer unit 1003 and the latch circuits 1202-1 to 1202-4 included in the latch unit 1004 correspond to a signal output circuit.

Figure 17:
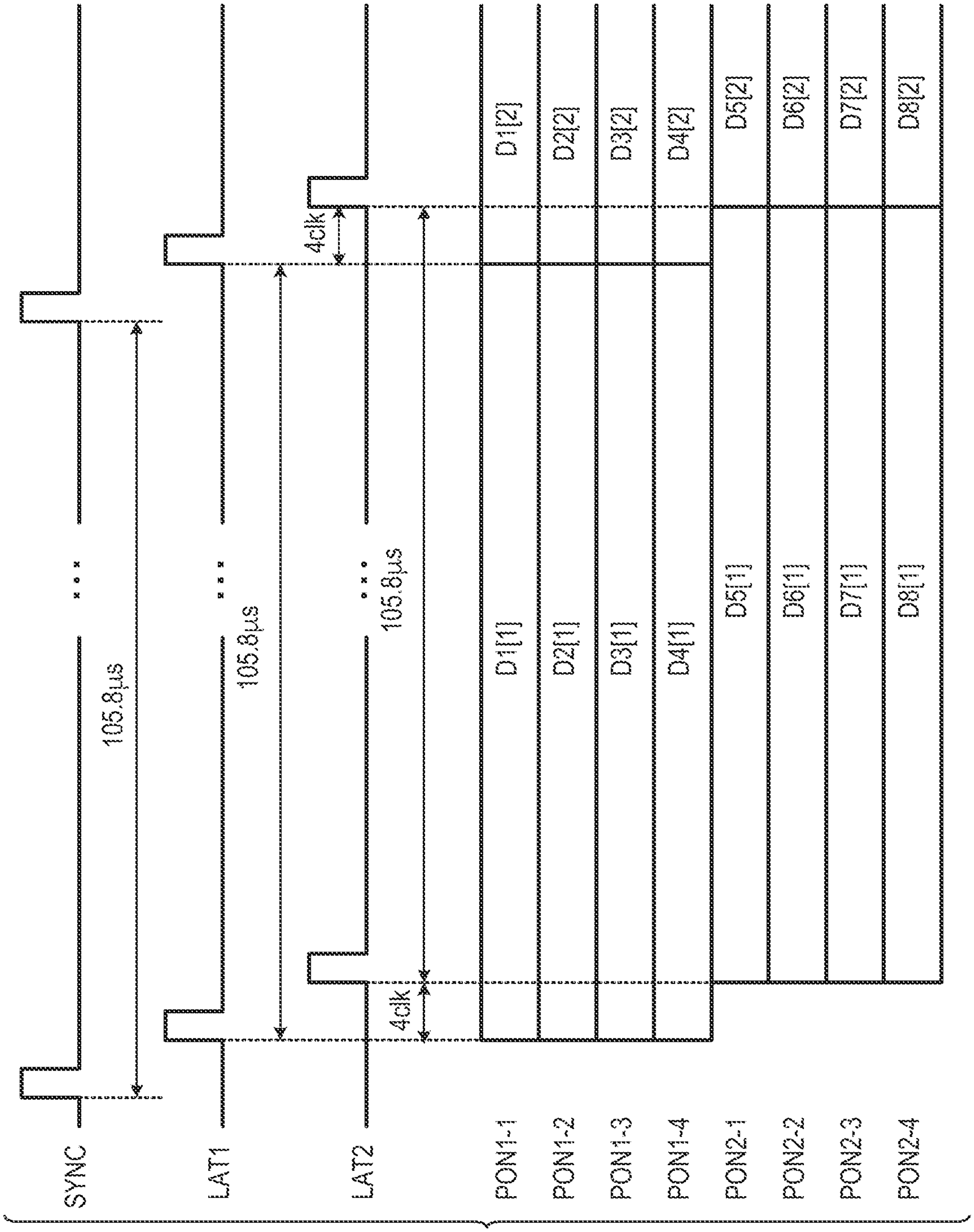
FIG. 17 is another timing chart of signals in a circuit unit according to an embodiment.

FIG. 17 illustrates a relation between the line synchronization signal of the signal line SYNC, the first latch signal and the second latch signal of the signal lines LAT1 and LAT2, and the drive signals output to the signal lines PON1-1 to PON1-4 and PON2-1 to PON2-4. The cycle of the line synchronization signal is about 105.8 μs as described above. The cycles of the first latch signal and the second latch signal are about 105.8 μs, which is same as that of the line synchronization signal. The timing of the second latch signal is behind the first latch signal by four clocks. More generally, the timing of the (q+1)-th latch signal (q being an integer from 1 to 747) is behind the q-th latch signal by four clocks.

The transfer unit 1003 sequentially receives the pieces of image data D1[1] to D2992[1] in synchronization with an initial line synchronization signal illustrated in FIG. 17. In addition, the transfer unit 1003 sequentially receives the pieces of image data D1[2] to D2992[2] in synchronization with a second line synchronization signal illustrated in FIG. 17. The four latch circuits of the latch unit 1004-001 output drive signals, based on the pieces of image data D1[1] to D4[1], to the signal lines PON1-1 to PON1-4 from the timing of the first latch signal based on the initial line synchronization signal illustrated in FIG. 17. Output of drive signals based on the pieces of image data D1[1] to D4[1] continues until a first latch signal based on the second line synchronization signal is received. Upon receiving the first latch signal based on the second line synchronization signal, the four latch circuits of the latch unit 1004-001 output drive signals based on the pieces of image data D1[2] to D4[2] to the signal lines PON1-1 to PON1-4. Similarly, the four latch circuits of the latch unit 1004-002 output drive signals based on the pieces of image data D5[1] to D8[1] to the signal lines PON2-1 to PON2-4 from the timing of the second latch signal based on the initial line synchronization signal. Output of drive signals based on the pieces of image data D5[1] to D8[1] continues until a second latch signal based on the second line synchronization signal is received. Upon receiving the second latch signal based on the second line synchronization signal, the four latch circuits of the latch unit 1004-002 output drive signals based on the pieces of image data D5[2] to D8[2] to the signal lines PON2-1 to PON2-4. The same goes for the latch units 1004-003 to 1004-748. In other words, each of the latch units 1004 are cascade-connected to each other such that they can sequentially transmit latch signals.

Here, the cycle of the line synchronization signal is longer than the time required for transmitting latch signals corresponding to all of the light emitting elements, and therefore all of the latch signals are output in a period from when a line synchronization signal is transmitted to when a next line synchronization signal is transmitted. Since the light emitting points 602 are sequentially driven in a state where the timing of starting the light emission is shifted for each of the four light emitting points, it is possible to reduce the noise generated at turning on the light emitting points, in comparison to the case of simultaneously turning on all the light emitting points. Furthermore, the output to the current drive unit 1104 is performed for the duration of two consecutive line synchronization signals.

In the present embodiment, the transfer unit 1003 and the latch unit 1004 form an output unit that receives image data corresponding to each of the plurality of light emitting points 602, and outputs a drive signal for the corresponding light emitting point 602 based on the received image data. More specifically, each of the 748 latch units 1004-001 to 1004-748 of the present embodiment includes four latch circuits, and therefore the output unit includes a total of 2992 latch circuits. Each latch circuit corresponds to one of the 2992 light emitting points 602 included in one light emitting chip 400. Each latch circuit latches image data of the corresponding light emitting point 602, and outputs a drive signal for the corresponding light emitting point 602 based on the latched image data.

Figure 15:
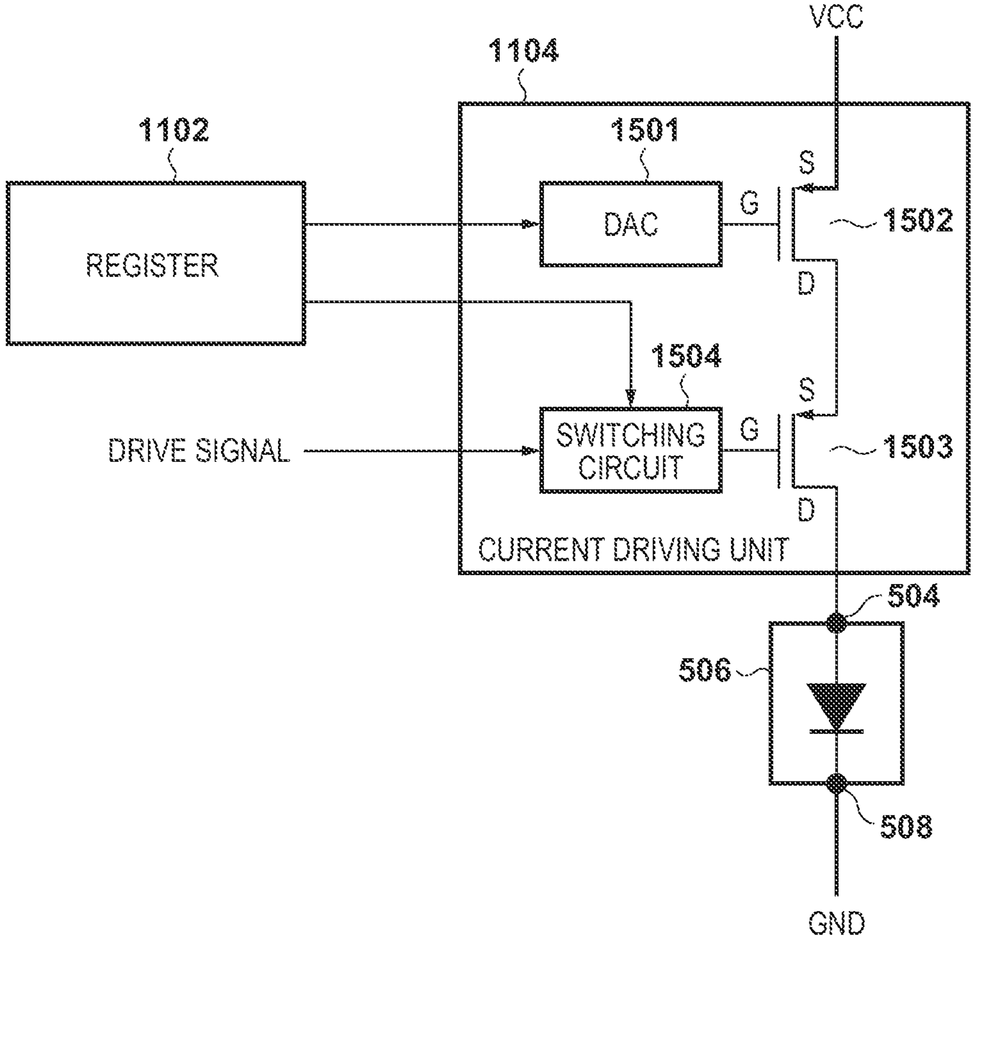
FIG. 15 is a configuration diagram of a current drive unit according to an embodiment.

FIG. 15 illustrates a configuration of the current drive unit 1104. Here, FIG. 15 illustrates only a part of the circuit corresponding to one light emitting point 602. The light emitting chip 400 according to the present embodiment include a total of 2992 light emitting points 602, and therefore the light emitting chip 400 include 2992 circuit units illustrated in FIG. 15. ADAC 1501 outputs an analog voltage in accordance with a digital value indicated by the control data stored in the register 1102. In an FET 1502, which is a P-channel MOSFET, a source terminal is connected to a power supply voltage VCC and a drain terminal is connected to a source terminal of an FET 1503. The analog voltage output by the DAC 1501 is applied to the gate terminal of the FET 1502. Further, in the FET 1503, which is also a P-channel MOSFET, a drain terminal is connected to the lower electrode 504. The drive signal output from the image data holding unit 1103 is input to the gate terminal of the FET 1503 via a switching circuit 1504. The drive signal is a one-bit binary signal of a high level or a low level, and the FET 1503 is on during the high level, and the FET 1503 is off during the low level.

While FET 1503 is on, electric current flows from the power supply voltage VCC to the light emitting layer 506 via FET 1502 and FET 1503 and thus the light emitting point 602 emits light. The light emission intensity of the light emitting point 602 varies in accordance with the current flowing through the light emitting layer 506, and the value of the current is controlled by an analog voltage output from the DAC 1501. In other words, the light emission intensity of each of the light emitting points 602 is controlled by the control data stored in the register 1102. Here, the control data may individually indicate a digital value of each DAC 1501 corresponding to respective light emitting points 602, or may indicate one digital value for each group of the plurality of light emitting points 602.

Here, the switching circuit 1504 is provided to switch between a normal state, in which the drive signal is applied to the gate terminal of the FET 1503, and a test state. In the test state, the switching circuit 1504 applies a high level signal to the gate terminal of the FET 1503, forcibly causing the FET 1503 to be on state. Here, the switching between the normal state and the test state is also performed based on control data stored in the register 1102. The test state maybe used to cause any of the light emitting points 602 to emit light in manufacturing of the exposure head 106.

Figure 16:
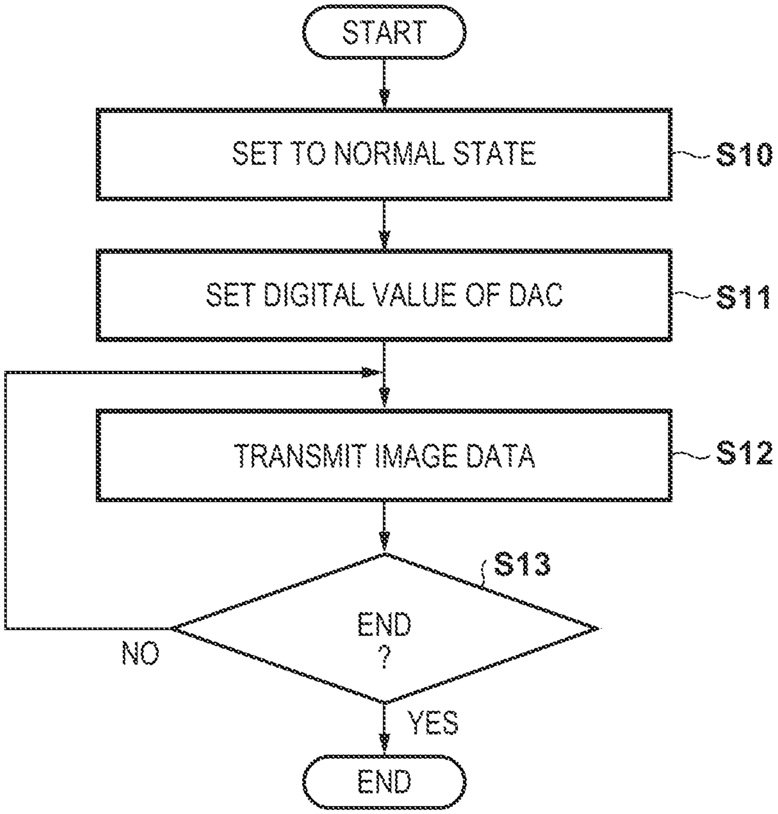
FIG. 16 is a flowchart of processing executed by an image controller, according to an embodiment.

FIG. 16 is a flowchart of processing executed by the image controller 700 when a print request is issued from a user. At S10, the image controller 700 writes, to the register 1102 of each of the light emitting chips 400, control data for making the state of each switching circuit 1504 to be the normal state. At S11, the image controller 700 sets, in the register 1102 of each of the light emitting chips 400, a digital value to be set in the DAC 1501 corresponding to each light emitting point 602. Subsequently, at the start timing of image formation, the image controller 700 transmits an image data at S12 and starts exposing the photoconductor 102. The image controller 700 determines at S13 whether or not the image formation is completed, and when the image formation is not completed, repeats the processing from S12. When, on the other hand, the image formation is completed, the image controller 700 terminates the processing of FIG. 13.

Here, when each light emitting point 602 is made to emit light in manufacturing of the exposure head 106, the image controller 700 first sets, in the register 1102, a digital value to be set in the DAC 1501 corresponding to the target light emitting point 602. Subsequently, the image controller 700 writes, to the register 1102, control data for making the state of the switching circuit 1504 to be in the test state. After completion of the test, the image controller 700 writes control data for making the state of the switching circuit 1504 to be the normal state. Here, a configuration of making the light emitting points 602 to be the test state may be a configuration in which each light emitting point 602 is independently specified, or a configuration in which each light emitting point group including two or more light emitting points 602 is specified, for example, all the light emitting points 602 are collectively specified.

As has been described above, the latch unit 1004-*m* in the present embodiment latches the pieces of image data D(4m), D(4m−1), D(4m−2) and D4(*m*−3) when the m-th latch signal is input, and outputs a drive signal based on the latched image data to the current drive unit 1104. Such a configuration allows for turning on the plurality of light emitting units 602, based on the image data transmitted in serial communication, without providing flip-flop circuits, configured to transfer the input image data in the main scan direction, in number corresponding to the number of light emitting units. In other words, increase in size of the light emitting chips or increase in cost of the light emitting chips due to the flip-flop circuits, configured to transfer the input image data in the main scan direction, being provided in number corresponding to the number of the light emitting units can be prevented. In other words, increase in size and in cost of the light emitting chips can be prevented more than the related art.

Generally, the amount of light emitted by organic EL film is smaller than the amount of light emitted by an LED formed by using gallium arsenide or the like, for example. In the present embodiment, drive signals for controlling emission/non-emission of light of each light emitting point 602 are output to the current drive unit 1104 for the duration of two consecutive line synchronization signals. That is, in the present embodiment, the light emitting point 602 may emit light for the duration of two consecutive line synchronization signals. As a result, exposing time for the photoconductor 102 can be made longer than a configuration in which the light emitting point 602 emits light for only a part of the duration of two consecutive line synchronization signals. As a result, the photoconductor 102 can be sufficiently exposed to form a toner image, whereby the toner image is appropriately formed on the photoconductor 102. In other words, it is possible to prevent a case in which the photoconductor 102 is not sufficiently exposed to form a toner image due to the light emitting point 602 only emitting light for a part of the duration of two consecutive line synchronization signals.

When the FET 1503 is made to be on, there is a possibility that the power line voltage may fluctuate due to the light emitting point 602 being supplied with the current output from the power supply VCC, and thus radiation noise may be generated from the power line. In the present embodiment, the light emitting points 602 are sequentially turned on four by four, instead of simultaneously turning on all the light emitting points 602 provided in the light emitting chips 400. As a result, voltage fluctuation of the power line is prevented in comparison with the case of simultaneously turning on the FET 1503 corresponding to each of the light emitting points 602 in order to simultaneously turn on all the light emitting points 602 provided in the light emitting chips 400. As a result, the radiation noise generated from the power line can be reduced.

In addition, the light emission periods of the light emitting points 602 adjacent to each other in the main scan direction overlap with each other, in the duration of two consecutive line synchronization signals. When the light emission start timings of the light emitting points 602 are largely different, exposure positions of the light emitting points 602 in the sub scan direction may be largely different. By overlapping the exposure periods of the light emitting points 602 with each other, exposure time of the photoconductor 102 can be secured and the risk of misalignment of exposure positions in the sub scan direction for each light emitting point can be reduced.

Here, in the present embodiment, one light emitting chip 400 includes four sets of 748 light emitting points 602 arranged along the main scan direction. Accordingly, a total of 2992 latch circuits corresponding to each light emitting point 602 are grouped by each four latch circuits, which number corresponds to the number of sets, into a total of 748 groups, and one latch unit 1004 is provided for each corresponding group. In addition, since one group includes four latch circuits, the transfer unit 1003 sequentially transfers the image data to the four signal lines PDATA1 to PDATA4. However, for example, the number of latch circuits included in one group may be an integer multiple of the number of sets. For example, when the number of latch circuits included in one group is set to be twice the number of sets for the light emitting chips 400 including four sets of 748 light emitting points 602 arranged along the main scan direction, the number of groups is 374, and the number of latch units 1004 is 374. Additionally in this case, the transfer unit 1003 sequentially transfers the image data to eight signal lines. In the present invention, the number of latch circuits included in one group is not limited to an integer multiple of the number of sets, and may be, for example, one over an integer of the number of sets. In addition, the number of latch circuits included in one group may be set irrespective of the number of sets. Furthermore, the number of light emitting points 602 (or the number of latch circuits) included in each group may not be the same. In other words, the number of light emitting points 602 (or the numbers of latch circuits) included in each group may be any number equal to or larger than one.

Although specific numerical values are used for description in the aforementioned embodiment, the specific numerical values are merely exemplary and the present invention is not limited to any specific numerical values used in the embodiment. Specifically, the number of the light emitting chips 400 provided on one printed substrate 202 is not limited to 20, and may be any number equal to or larger than one. In addition, the number of light emitting points 602 included in each of the light emitting chips 400 is not limited to 2992 and may be other numbers. Further, in the present embodiment, one light emitting chip 400 includes four sets of 748 light emitting points arranged along the main scan direction, the number of sets may be any number equal to or larger than one. In addition, the light emitting points 602 are arranged in the main scan direction at a pitch of about 21.16 μm, which corresponds to the resolution of 1200 dpi, the arrangement interval of the light emitting points 602 may be other values.

Further, in the aforementioned embodiment, the image forming apparatus transfers the toner image formed on each photoconductor 102 onto the sheet conveyed on the transfer belt 111. However, the image forming apparatus may transfer the toner image of each photoconductor 102 onto the sheet via an intermediate transfer member. In addition, the image forming apparatus may be a color image forming apparatus that forms an image using toner of a plurality of colors, or a monochrome image forming apparatus that forms an image using toner of one color.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-132718, filed Aug. 23, 2022, which is hereby incorporated by reference herein in its entirety.

What is claimed is:

1. A light emitting chip comprising:

a light emitting unit array including a plurality of light emitting units arranged in a predetermined direction;

an image data input terminal configured to be input with image data;

a first data storage unit configured to store data, input from the image data input terminal, for causing a first light emitting unit included in the plurality of light emitting units to emit light;

a second data storage unit configured to store data, input from the image data input terminal, for causing a second light emitting unit included in the plurality of light emitting units to emit light;

a signal output unit configured to output a first trigger signal and a second trigger signal delayed with respect to the first trigger signal; and a drive unit configured to drive the first light emitting unit, in a case where the first trigger signal is output, based on data stored in the first data storage unit, and drive the second light emitting unit, in a case where the second trigger signal is output, based on data stored in the second data storage unit.

2. The light emitting chip according to claim 1, wherein the signal output unit outputs the first trigger signal and the second trigger signal at a predetermined cycle, and wherein the drive unit drives the first light emitting unit, based on data stored in the first data storage unit, in a period from when the first trigger signal is output to when the next first trigger signal is output, and drives the second light emitting unit, based on data stored in the second data storage unit, in a period from when the second trigger signal is output to when the next second trigger signal is output.

3. The light emitting chip according to claim 1, wherein the light emitting chip includes a synchronization signal input terminal configured to be input with a synchronization signal at a predetermined cycle, and wherein the signal output unit outputs the first trigger signal based on the synchronization signal.

4. The image forming apparatus according to claim 3, wherein the plurality of light emitting units emit light for exposing a photoconductor that is rotating, and wherein the predetermined cycle is a cycle in which the photoconductor rotates by a resolution in a circumferential direction of the photoconductor in the image data.

5. The light emitting chip according to claim 1, wherein the light emitting chip includes a synchronization signal input terminal configured to be input with a synchronization signal at a predetermined cycle, and wherein the signal output unit outputs the first trigger signal and the second trigger signal in a period from when the synchronization signal is input to when the next synchronization signal is input.

6. The light emitting chip according to claim 1, wherein, when the data stored in the first data storage unit indicates light emission of the first light emitting unit, and the data stored in the second data storage unit indicates light emission of the second light emitting unit, there is an overlap between a period in which the drive unit drives the first light emitting unit in response to the first trigger signal and the first light emitting unit emits light and a period in which the drive unit drives the second light emitting unit in response to the second trigger signal and the second light emitting unit emits light.

7. The light emitting chip according to claim 1, wherein the light emitting chip includes a third data storage unit configured to store data, input from the image data input terminal, for causing a third light emitting unit included in the plurality of light emitting units to emit light, wherein the signal output unit includes a first signal output circuit configured to output the first trigger signal, a second signal output circuit configured to output the second trigger signal based on the first trigger signal, and a third signal output circuit configured to output a third trigger signal based on the second trigger signal, wherein the drive unit drives the third light emitting unit, in a case where the third trigger signal is output, in accordance with data stored in the third data storage unit, and wherein the first signal output circuit, the second signal output circuit, and the third signal output circuit are cascade-connected.

8. The light emitting chip according to claim 1, wherein the plurality of light emitting units is organic EL.

9. A light emitting chip comprising:

a light emitting unit array including a plurality of light emitting units arranged in a predetermined direction;

an image data input terminal configured to be input with image data;

a signal output unit configured to output trigger signals respectively corresponding to the plurality of light emitting units, with output start timings of respective trigger signals output by the signal output unit being different from each other;

a plurality of data storage units provided respectively corresponding to the plurality of light emitting units and configured to store data input from the image data input terminal, each of the plurality of data storage units being configured to output stored data in a case where a corresponding trigger signal is output; and a drive unit configured to drive the plurality of light emitting units based on data output from the plurality of data storage units.

10. The light emitting chip according to claim 9, wherein the signal output unit outputs each trigger signal at a predetermined cycle, and wherein the drive unit drives each of the plurality of light emitting units based on data corresponding to the trigger signal stored in the data storage unit in a period from when the trigger signal is output to when the next trigger signal is output.

11. The light emitting chip according to claim 9, wherein the light emitting chip includes a synchronization signal input terminal configured to be input with a synchronization signal at a predetermined cycle, and wherein the signal output unit outputs at least one of the trigger signals based on the synchronization signal.

12. The light emitting chip according to claim 11, wherein the plurality of light emitting units emit light for exposing a photoconductor that is rotating, and wherein the predetermined cycle is a cycle in which the photoconductor rotates by a resolution in a circumferential direction of the photoconductor in the image data.

13. The light emitting chip according to claim 9, wherein the light emitting chip includes a synchronization signal input terminal configured to be input with a synchronization signal at a predetermined cycle, and wherein the signal output unit outputs each of the trigger signals in a period from when the synchronization signal is input to when the next synchronization signal is input.

14. The light emitting chip according to claim 9, wherein, among the plurality of light emitting units, each of the plurality of light emitting units driven based on the data indicating light emission has a light emitting period that overlaps with each other.

15. The light emitting chip according to claim 9, wherein the signal output unit includes a plurality of signal output circuits configured to output the trigger signal respectively corresponding to the plurality of light emitting units, and wherein each of the plurality of signal output circuits is cascade-connected.

16. The light emitting chip according to claim 9, wherein the plurality of light emitting units is organic EL.

17. An image forming apparatus comprising:

a photoconductor; and a light emitting chip comprising:

a light emitting unit array including a plurality of light emitting units arranged in a predetermined direction;

an image data input terminal configured to be input with image data;

a first data storage unit configured to store data, input from the image data input terminal, for causing a first light emitting unit included in the plurality of light emitting units to emit light;

a second data storage unit configured to store data, input from the image data input terminal, for causing a second light emitting unit included in the plurality of light emitting units to emit light;

a signal output unit configured to output a first trigger signal and a second trigger signal delayed with respect to the first trigger signal; and a drive unit configured to drive the first light emitting unit, in a case where the first trigger signal is output, based on data stored in the first data storage unit, and drive the second light emitting unit, in a case where the second trigger signal is output, based on data stored in the second data storage unit.

18. An image forming apparatus comprising:

a photoconductor; and a light emitting chip comprising:

a light emitting unit array including a plurality of light emitting units arranged in a predetermined direction;

an image data input terminal configured to be input with image data;

a signal output unit configured to output trigger signals respectively corresponding to the plurality of light emitting units, output start timings of respective trigger signals output by the signal output unit being different from each other;

a plurality of data storage units provided respectively corresponding to the plurality of light emitting units and configured to store data input from the image data input terminal, each of the plurality of data storage units being configured to output stored data in a case where a corresponding trigger signal is output; and a drive unit configured to drive the plurality of light emitting units based on data output from the plurality of data storage units.

* * * * *